United States Patent
Kim

(10) Patent No.: US 12,494,536 B2
(45) Date of Patent: Dec. 9, 2025

(54) METHOD FOR ADHERING TAPE FOR RECHARGEABLE BATTERY

(71) Applicant: LG Energy Solution, Ltd., Seoul (KR)

(72) Inventor: Byungryong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 472 days.

(21) Appl. No.: 18/004,119

(22) PCT Filed: Jan. 27, 2022

(86) PCT No.: PCT/KR2022/001514
§ 371 (c)(1),
(2) Date: Jan. 3, 2023

(87) PCT Pub. No.: WO2022/164237
PCT Pub. Date: Aug. 4, 2022

(65) Prior Publication Data
US 2023/0268595 A1   Aug. 24, 2023

(30) Foreign Application Priority Data
Jan. 28, 2021  (KR) .......................... 10-2021-0012229

(51) Int. Cl.
*H01M 50/186*  (2021.01)
*B65H 35/00*  (2006.01)
*H01M 50/105*  (2021.01)

(52) U.S. Cl.
CPC ...... *H01M 50/186* (2021.01); *B65H 35/0033* (2013.01); *H01M 50/105* (2021.01); *B65H 2701/377* (2013.01)

(58) Field of Classification Search
CPC ............. H01M 50/186; H01M 50/171; H01M 50/202; B65H 35/0033; B65H 2701/377; B65H 2701/37
See application file for complete search history.

(56) References Cited

U.S. PATENT DOCUMENTS

| | | | |
|---|---|---|---|
| 8,882,858 B2 * | 11/2014 | Bacci ................ | H01M 10/0431 29/623.1 |
| 9,748,548 B2 * | 8/2017 | Malcolm ............. | H01M 50/519 |
| 11,962,020 B2 * | 4/2024 | Shin ..................... | H01M 50/116 |

(Continued)

FOREIGN PATENT DOCUMENTS

| | | | |
|---|---|---|---|
| CN | 205646011 U | * | 10/2016 |
| CN | 112216873 A | | 1/2021 |

(Continued)

OTHER PUBLICATIONS

Translation of CN-205646011-U (Year: 2016).*
(Continued)

*Primary Examiner* — Jeffrey T Carley
(74) *Attorney, Agent, or Firm* — Lerner David LLP

(57) ABSTRACT

A method of adhering a tape for a rechargeable battery is provided. The method includes contacting one surface of a rechargeable battery with an attachment surface of a tape via an attachment roller interposed therebetween, rotating the attachment roller in a first direction to attach the tape to one surface of the rechargeable battery, and rotating the attachment roller in a second direction opposite the first direction to cut the tape.

10 Claims, 5 Drawing Sheets

(56) References Cited

U.S. PATENT DOCUMENTS

| | | | | |
|---|---|---|---|---|
| 2004/0154160 A1* | 8/2004 | Hong | ............... | H01M 10/0583 |
| | | | | 29/730 |
| 2006/0027331 A1* | 2/2006 | Hirai | ...................... | B29C 63/02 |
| | | | | 156/541 |
| 2018/0097210 A1* | 4/2018 | Jeung | .................. | H01M 50/598 |
| 2018/0215490 A1* | 8/2018 | Choi | ................ | H01M 10/0404 |
| 2020/0388861 A1* | 12/2020 | Kawamura | ............ | B32B 27/06 |
| 2022/0013844 A1* | 1/2022 | Choi | ...................... | B65H 37/04 |

FOREIGN PATENT DOCUMENTS

| | | | |
|---|---|---|---|
| CN | 214956995 U | * | 11/2021 |
| JP | S4844118 B1 | | 12/1973 |
| JP | 2019089569 A | * | 6/2019 |
| JP | 2019110189 A | | 7/2019 |
| KR | 20070081653 A | | 8/2007 |
| KR | 101166151 B1 | | 7/2012 |
| KR | 101224181 B1 | | 1/2013 |
| KR | 20130094974 A | | 8/2013 |
| KR | 101358760 B1 | | 2/2014 |
| KR | 20150045098 A | | 4/2015 |
| KR | 20170117681 A | | 10/2017 |
| KR | 20180089014 A | | 8/2018 |
| KR | 101992658 B1 | | 6/2019 |
| KR | 20200093172 A | | 8/2020 |
| WO | 2020/222529 A1 | | 11/2020 |

OTHER PUBLICATIONS

Translation of CN-214956995-U (Year: 2021).*
Translation of JP-2019089569-A (Year: 2019).*
International Search Report for PCT/KR2022/001514 mailed May 9, 2022. 3 pgs.
Extended European Search Report including Search Opinion from EP Appl. No. 22746263.7, dated Nov. 8, 2024, pp. 1-12.

* cited by examiner

METHOD FOR ADHERING TAPE FOR RECHARGEABLE BATTERY

CROSS-REFERENCE TO RELATED APPLICATION

This application is a national stage entry under 35 U.S.C. § 371 of International Application No. PCT/KR2022/001514 filed Jan. 27, 2022, which claims priority from Korean Patent Application No. 10-2021-0012229 filed in the Korean Intellectual Property Office on Jan. 28, 2021, the entire contents of which are incorporated herein by reference.

TECHNICAL FIELD

The present invention relates to an adhering method of a tape for a rechargeable battery, and more specifically, to an adhering method of a tape for a rechargeable battery that may be attached without sagging of the tape without additional equipment.

BACKGROUND ART

Recently, interest in a price increase of energy sources due to depletion of fossil fuels and environmental pollution has increased, and demand for environmentally-friendly alternative energy sources has become an indispensable factor for future life. Therefore, research on various power generation technologies such as nuclear power, solar power, wind power, and tidal power has been continuously conducted, and interest in a power storing apparatus for efficiently using energy generated as described above has also increased.

Particularly, in accordance with the development of technologies for mobile devices and an increase in demand for the mobile devices, a demand for batteries as an energy source has rapidly increased. Therefore, many studies on batteries that may satisfy various needs have been conducted.

Representatively, there are high demands on lithium rechargeable batteries such as a lithium ion battery or a lithium ion polymer battery having merits including high energy density, a good discharging voltage, and output stability.

Such rechargeable batteries are classified depending on a structure of an electrode assembly in which a positive electrode, a negative electrode, and a separator interposed between the positive electrode and the negative electrode are stacked. Representative examples thereof may include a jelly-roll type (wound-type) of electrode assembly in which a positive electrode and a negative electrode having a long sheet-like shape are wound with a separator interposed therebetween, a stacked type of electrode assembly in which a plurality of positive electrodes and negative electrodes that are cut in a predetermined size unit are sequentially stacked with separators interposed therebetween, and the like. Recently, a stack/folding type of electrode assembly in which unit cells obtained by stacking positive and negative electrodes of a predetermined unit with separators interposed therebetween, which are disposed on a separation film, are sequentially wound, has been developed as an electrode assembly having an advanced structure in which the jelly-roll type and the stack type are mixed in order to solve problems of the jelly-roll types and the stack types of electrode assemblies.

In addition, depending on the shape of the case, the rechargeable battery may be classified as a cylindrical rechargeable battery in which the electrode assembly is embedded in a cylindrical case, a prismatic rechargeable battery in which the electrode assembly is embedded in a prismatic case, and a pouch-type rechargeable battery in which the electrode assembly is embedded in a pouch-type case of a laminate sheet.

In the process of manufacturing such a rechargeable battery and the process of forming a battery module using a stack member of the rechargeable batteries, a process of attaching an adhesive tape is applied at various stages. For example, a process of attaching the adhesive tape to sealing the bonding part of the pouch-type case to the cylindrical case including the electrode assembly, or the bonding part of the case and the electrode lead, or attaching an adhesive tape to a portion to be fixed when stacking a plurality of rechargeable batteries, or maintaining the stack structure of the electrode assembly, may be applied.

FIG. 1 is a view schematically illustrating a tape attachment process for a conventional rechargeable battery.

As shown in FIG. 1, a process of attaching a tape to a rechargeable battery 100 is done by moving a fixing member 10 supporting the rechargeable battery 100 in the same direction A1 as one direction D1 on an attachment surface of the tape while rotating an attachment roller 20 in one direction D1.

At this time, after completing the tape attaching in the desired area, the tape supplied through the attachment roller 20 is cut. As a method of cutting the tape, a method of applying tension to the tape by moving the fixing member 10 to be away from the attachment roller 20 is used. However, in this case, as shown in a part A, there is not enough power to cut the tape, so there is a case that the unnecessary extra tape droops from the attachment roller 20 or the rechargeable battery 100. When the extra tape in this stretched state is attached to the electrode lead of the rechargeable battery 100, there is a problem that welding defects may occur, and there is a problem that work efficiency may be reduced such as additional work of a worker is needed to remove the welding defects.

DISCLOSURE

Technical Problem

The problem to be solved by the present invention is to provide an adhering method of the tape for the rechargeable battery to improve the sagging problem that may occur when removing the tape without addition of a special device or process in the taping process, thereby minimizing defects and improving process efficiency.

However, the problem to be solved in the embodiments of the present invention is not limited to the foregoing problem, and may be variously extended in the scope of the technical spirit included in the present invention.

Technical Solution

An adhering method of a tape for a rechargeable battery according to an embodiment of the present invention includes: contacting one surface of a rechargeable battery with an attachment surface of a tape via an attachment roller interposed therebetween; rotating the attachment roller in a first direction to attach the tape to one surface of the rechargeable battery; and rotating the attachment roller in a second direction opposite the first direction to cut the tape.

Moving a support member that holds the rechargeable battery to move the rechargeable battery on which the tape attachment is completed may be further included.

The moving of the rechargeable battery may be performed simultaneously with the rotation of the attachment roller in the second direction.

The moving of the rechargeable battery may be performed after the rotation of the attachment roller in the second direction.

The rotation direction of the attachment roller may be controlled by a rotation motor connected to the attachment roller.

A release paper disposed on the opposite side to the adhered surface of the tape may be separated from the tape attached to one surface of the rechargeable battery by a guide roller.

The rechargeable battery may be a pouch-type rechargeable battery in which an electrolyte solution and an electrode assembly are housed in a pouch-type case, and the attachment of the tape may be performed to one surface of the pouch-type case.

The force to cut the tape may be the sum of the force applied to the tape by the rotation of the attachment roller in the second direction and the tension applied to the tape by moving the rechargeable battery.

The force that cuts the tape may be the force applied to the tape by the rotation of the attachment roller in the second direction.

When the attachment roller rotates in the first direction, one surface of the rechargeable battery may move along the first direction on the adhered surface.

Advantageous Effects

According to the embodiments of the present invention, the adhering method of the tape for a rechargeable battery that may improve the sagging problem that may occur when removing the tape without addition of a special device or process in the taping process to minimize defects and increase process efficiency may be provided.

The effects of the present invention are not limited to the foregoing effects, and other non-mentioned effects will be clearly understood by those skilled in the art from the description below.

MODE FOR INVENTION

Figure 1:
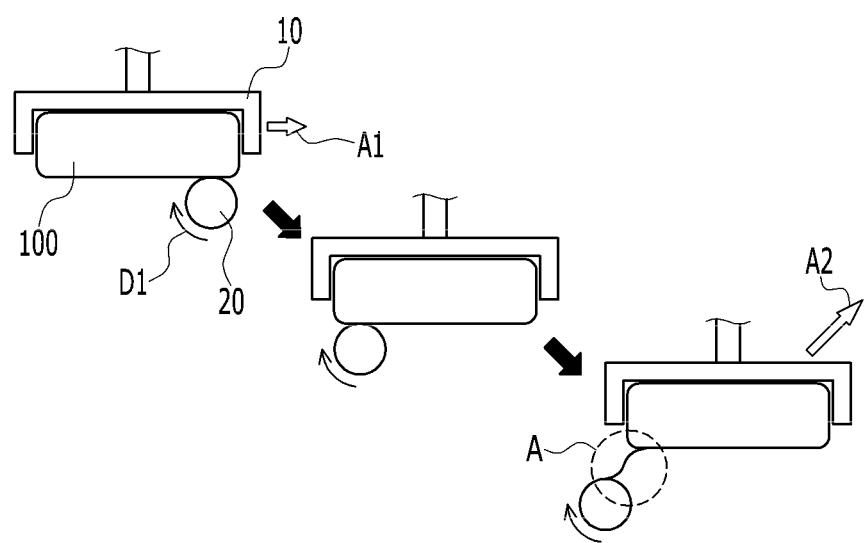
FIG. 1 is a view schematically illustrating an attachment process for a conventional rechargeable battery.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Parts that are irrelevant to the description are omitted in the drawings for clear description of the present invention, and like reference numerals designate like elements throughout the specification.

Further, the size and thickness of the elements shown in the drawings are arbitrarily illustrated for better understanding and ease of description, and the present invention is not necessarily limited thereto. In the drawings, the thickness of layers, films, panels, regions, etc., are exaggerated for clarity. In the drawings, for convenience of description, the thickness of layers, films, panels, areas, etc., are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Hereinafter, an adhering method of a tape for a rechargeable battery according to an embodiment of the present invention is described with reference to FIG. 2 to FIG. 5.

Figure 2:
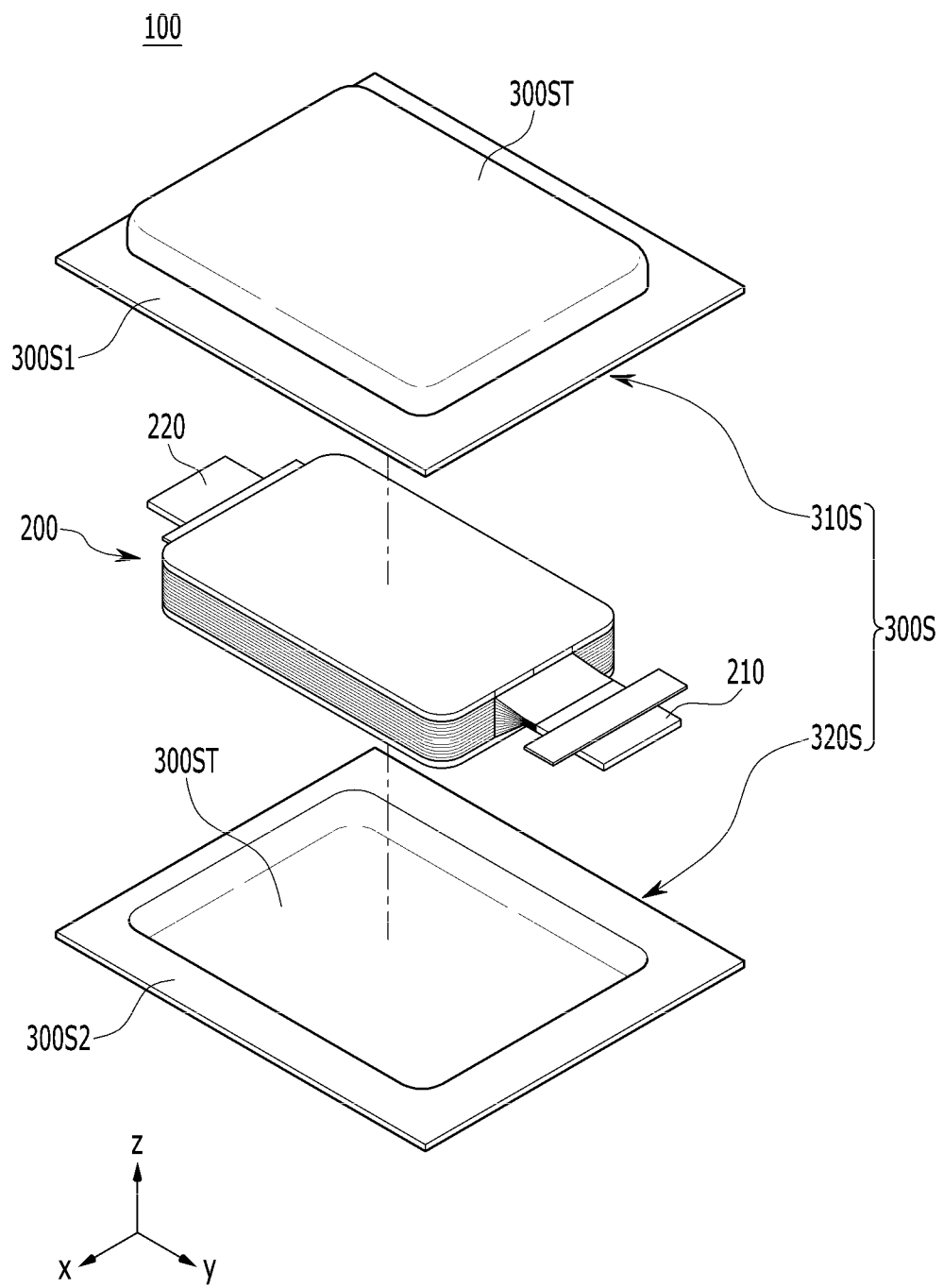
FIG. 2 is an exploded perspective view of a pouch-type rechargeable battery to which an adhering method of a tape for a rechargeable battery according to an embodiment of the present invention may be applied.
Figure 3:
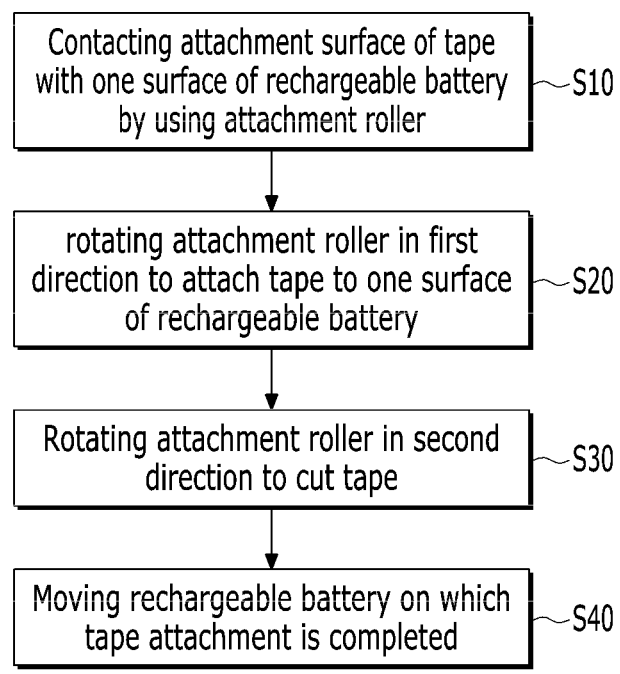
FIG. 3 is a flowchart for explaining an adhering method of a tape for a rechargeable battery according to an embodiment of the present invention.
Figure 4:
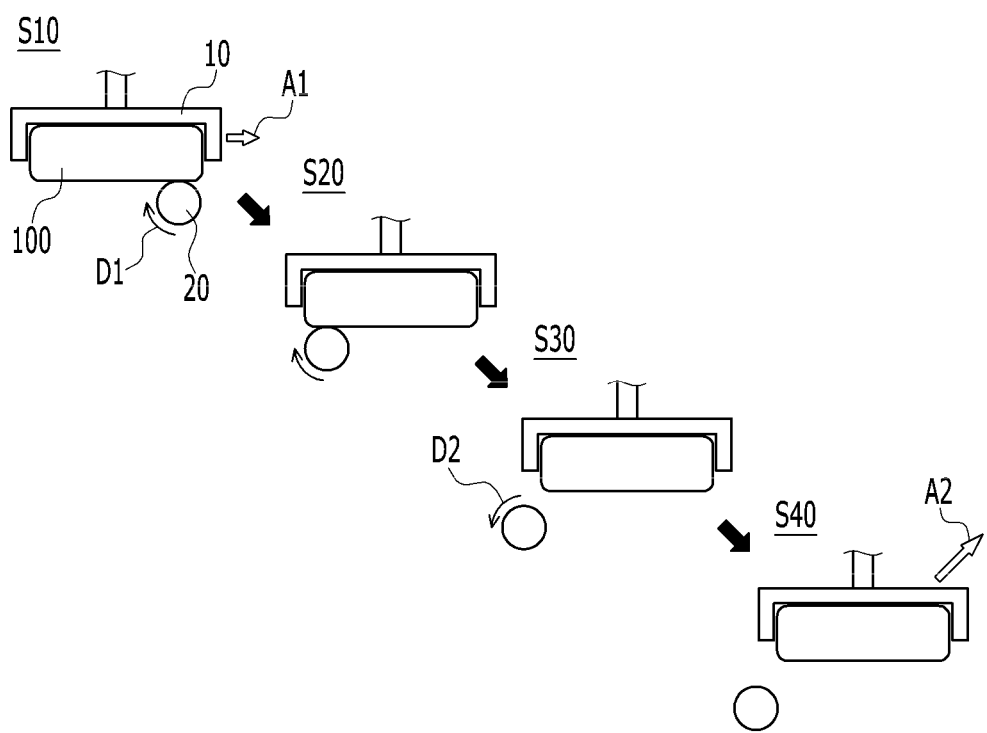
FIG. 4 is a schematic view of an adhering method of a tape for a rechargeable battery according to an embodiment of the present invention.
Figure 5:
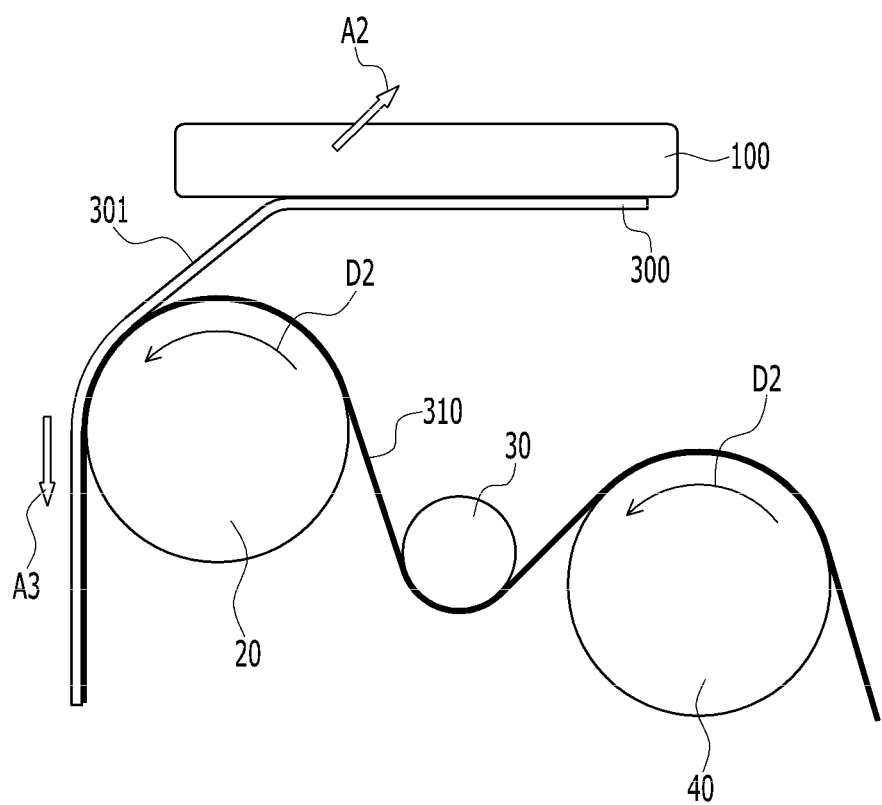
FIG. 5 is a view showing steps (S30) and (S40) of FIG. 4 in more detail.

FIG. 2 is an exploded perspective view of a pouch-type rechargeable battery to which an adhering method of a tape for a rechargeable battery according to an embodiment of the present invention may be applied. FIG. 3 is a flowchart for explaining an adhering method of a tape for rechargeable battery according to an embodiment of the present invention. FIG. 4 is a schematic view of an adhering method of a tape for a rechargeable battery according to an embodiment of the present invention. FIG. 5 is a view showing steps (S30) and (S40) of FIG. 4 in more detail.

First, by using an attachment roller 20, an adhered surface of a tape is in contact with on one side of a rechargeable battery 100 (S10).

The tape (300, referring to FIG. 5) has an adhered surface 301, and a release paper 310 is attached to the opposite surface of the adhered surface. The tape 300 is supplied from a separate supply roller (not shown) between the attachment roller 20 and one surface of the rechargeable battery 100, that is, between attachment surfaces to be attached, with the state that the attachment surface 301 is in contact with one surface 101 of the rechargeable battery 100 so that the tape 300 is interposed between the rechargeable battery 100 and the attachment roller 20.

At this time, the rechargeable battery 100 to be targeted may be of any type, and may be applied to any process to which a taping is applied during the manufacturing process. In the present embodiment, the case of applying the tape to the outer surface of the pouch-type rechargeable battery is described as an example.

FIG. 2 is an exploded perspective view of a pouch-type rechargeable battery to which an adhering method of a tape for a rechargeable battery according to an embodiment of the present invention may be applied. Referring to FIG. 2, the pouch-type rechargeable battery 100 may be manufactured by accommodating the electrode assembly 200 inside the pouch-type battery case 300S and then sealing it. The electrode assembly 200 may include a positive electrode, a negative electrode, and a separator disposed between the positive electrode and the negative electrode. Each of the positive electrode and the negative electrode includes a positive electrode tab and a negative electrode tab (not shown), and a positive electrode lead 210 connected to the positive electrode tab and a negative electrode lead 220 connected to the negative electrode tab may be exposed outside the pouch-type battery case 300S. In addition, for sealing and insulation, the positive electrode lead 210 and the negative electrode lead 220 may be positioned on sealing parts 300S1 and 300S2 in a state surrounded by the lead film, respectively.

The pouch-type battery case 300S is made of a laminate sheet, and may include a resin layer for thermal fusion and a metal layer to prevent a material penetration. This pouch-type battery case 300S may include an upper case 310S and a lower case 320S. In each of the upper case 310S and the lower case 320S, an accommodating part 300ST of a concave shape in which the electrode assembly 200 may be seated may be formed.

According to the outer circumference of the accommodating part 300ST, the upper case 310S, and the lower case 320S may be provided with the sealing parts 300S1 and 300S2, respectively. The sealing part 300S1 of the upper case 310S and the sealing part 300S2 of the lower case 320S are thermally fused with each other, and the pouch-type battery case 30 may be sealed with the formed sealing parts 300S1 and 300S2. That is, the resin layer in the sealing part 300S1 and the resin layer in the sealing part 300S2 may be thermally fused to each other.

On the outer surface of the rechargeable battery 100, when performing the taping for bonding the pouch-type battery case 300S, or maintaining the stacked state when constructing the stacking member by stacking a plurality of rechargeable batteries 100, the adhering method of the tape of this embodiment may be applied, but is not limited thereto.

Next, by rotating the attachment roller 20 in the first direction D1, the tape 300 is attached to one surface of the rechargeable battery 100 (S20).

That is, as shown in FIG. 4, while rotating the attachment roller 200 in the first direction (D1, a clockwise direction in the drawing), the tape 300 is adhered to the part to be attached in the rechargeable battery 100. In this case, while progressing the fixing member 10 supporting the rechargeable battery 100 in the same direction (i.e., an arrow direction in the drawing) as the rotation direction of the attachment roller 20 from the surface of the rechargeable battery 100, the tape 300 may be adhered to the surface of the rechargeable battery 100 by the rotation of the attachment roller 20. The tape 300 may be attached by advancing the fixing member 10 until the tape 300 reaches the desired area. Thereby, the release paper 310 is separated and wound to the guide roller 30 side, and the tape 300 is transferred to the surface of the rechargeable battery 100.

The rotation of the attachment roller 20 may be controlled by driving the rotation motor 40 connected to the attachment roller 20 with the guide roller 30 interposed therebetween.

Next, the tape 300 is cut by rotating the attachment roller 20 in the second direction D2 (S30).

As shown in FIG. 5, by the reverse rotation of the rotation motor 40 in the second direction D2, the force due to motor rotation is transmitted to the tape 300, so that the tape 300 may be cut. That is, by rotating the rotation motor 40 in the second direction D2 in reverse, the attachment roller 20 also rotates in the second direction D2, as a result, a force is applied to the tape 300 in the arrow direction A3, and the intermolecular bond of the tape 300 is cut by this force and the tape 300 is broken.

Conventionally, the tape 300 was cut only by the tension generated by the force that moves the attachment roller 20 and the rechargeable battery 100 away from each other. However, in this case, there was a problem that the tape 300 was not cut and was stretched because the cutting force was not sufficient. In this case, the stretched tape 300 was attached to parts other than the target to be attached, particularly the electrode leads, thereby causing welding defects, and a process was added to check whether such defective adhesion occurred, which could cause a loss in working time.

However, in an embodiment of the present invention, because the tape 300 is cut through the tension generated through the reverse rotation of the rotation motor 40, it is possible to control the tension applied to the tape 300 to be larger by adjusting the rotation amount of the rotation motor 40, therefore it is possible to cut the tape 300 strongly and accurately by using the torque of the rotation motor 40 without additional equipment. Therefore, it is possible to prevent defects due to the tape sagging, and to omit the confirmation process for checking the tape sagging, thereby shortening the working time. In addition, the movement with acceleration for the fixing member 10 supporting the rechargeable battery 100 for cutting the tape 300 may be eliminated or minimized, which may also reduce the working time and improve the process efficiency.

Next, the rechargeable battery 100 on which the attachment of the tape 300 is completed is moved (S40).

The rechargeable battery 100, of which the attachment is completed, moves away from the attachment roller 20 through the movement of the fixing member 10 (for example, it moves along the arrow A2 of the drawing). At this time, the moving step (S40) of the rechargeable battery 100 may be simultaneously performed with the cutting step (S30) of the tape 300 described above. When being performed at the same time, the force used to cut the tape 300 may be the sum of the force transmitted according to the reverse rotation of the rotation motor 40 and the force applied as the attachment roller 20 and the rechargeable battery 100 move away from each other, and thus the cutting of the tape 300 may be performed more quickly. However, the present invention is not limited thereto, and as described above, the tape 300 may be cut with only the torque of the rotation motor 40.

As above-described, according to an embodiment of the present invention, in the taping process among the manufacturing process of the rechargeable battery 100, it is possible to prevent the occurrence of the defects due to the sagging of the tape 300 by cutting the tape 300 accurately and quickly without the additional equipment, and the process efficiency may be improved by improving the processing speed.

In the present exemplary embodiment, terms indicating directions, such as front, rear, left, right, up, and down, are used, but these terms are for convenience of explanation only, and may vary depending on the location of the object or the position of the observer.

A plurality of rechargeable batteries manufactured by the manufacturing method to which the tape adhering method according to the present embodiment described above is applied may form a battery module. Such a battery module may be mounted together with various control and protection systems such as a battery management system (BMS) and a cooling system to form a battery pack.

The battery module or the battery pack may be applied to various devices. Specifically, the battery module or battery pack may be applied to transportation means, such as an electric bicycle, an electric vehicle, and a hybrid vehicle, but is not limited thereto, and the battery module or battery pack may be applied to various devices that can use a secondary battery.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF REFERENCE NUMERAL

10: fixing member
20: attachment roller
40: rotation roller
100: rechargeable battery
200: electrode assembly
300: tape
310: release paper

The invention claimed is:

1. A method of adhering a tape for a rechargeable battery, comprising:
   contacting one surface of a rechargeable battery with an attachment surface of a tape via an attachment roller interposed therebetween;
   rotating the attachment roller in a first direction to attach the tape to one surface of the rechargeable battery; and
   rotating the attachment roller in a second direction opposite the first direction to cut the tape.

2. The method of claim 1, further comprising:
   moving a support member that holds the rechargeable battery to move the rechargeable battery when an attachment of the tape is completed.

3. The method of claim 2, wherein:
   the moving of the rechargeable battery is performed simultaneously with the rotation of the attachment roller in the second direction.

4. The method of claim 2, wherein:
   the moving of the rechargeable battery is performed after the rotation of the attachment roller in the second direction.

5. The method of claim 1, wherein:
   a rotational direction of the attachment roller is controlled by a rotation motor connected to the attachment roller.

6. The method of claim 1, wherein:
   a release paper disposed on an opposite side to the attachment surface of the tape is separated from the tape attached to the one surface of the rechargeable battery by a guide roller.

7. The method of claim 1, wherein:
   the rechargeable battery is a pouch-type rechargeable battery including an electrolyte solution and an electrode assembly housed in a pouch-type case, and
   the tape is attached to one surface of the pouch-type case.

8. The method of claim 3, wherein:
   a force to cut the tape is a sum of the force applied to the tape by the rotation of the attachment roller in the second direction and a tension applied to the tape by moving the rechargeable battery.

9. The method of claim 4, wherein:
   a force that cuts the tape is the force applied to the tape by the rotation of the attachment roller in the second direction.

10. The method of claim 1, wherein:
    when the attachment roller rotates in the first direction, the one surface of the rechargeable battery moves along the first direction on the attachment surface.

* * * * *